United States Patent [19]

Mukaida et al.

[11] Patent Number: 5,224,971
[45] Date of Patent: Jul. 6, 1993

[54] METHOD AND APPARATUS FOR SEPARATING ISOTOPES

[75] Inventors: Hidetoshi Mukaida, Kawasaki; Hitomi Yamamoto, Tokyo; Motohisa Abe, Ibaraki; Isao Imamura, Kawasaki; Kazunori Shioda, Tokyo, all of Japan

[73] Assignee: Kabushiki Kaisha Toshiba, Kawasaki, Japan

[21] Appl. No.: 718,979

[22] Filed: Jun. 21, 1991

[30] Foreign Application Priority Data

| Jun. 22, 1990 | [JP] | Japan | 2-162713 |
| Nov. 28, 1990 | [JP] | Japan | 2-323245 |
| Apr. 12, 1991 | [JP] | Japan | 3-079804 |
| Apr. 12, 1991 | [JP] | Japan | 3-079805 |

[51] Int. Cl.$^5$ .......................... B03C 1/02; B03C 3/38
[52] U.S. Cl. .............................. 55/3; 55/11; 55/100; 55/102; 55/104; 55/135; 55/138; 204/157.22; 250/284; 373/11
[58] Field of Search ............ 55/2, 3, 12, 17, 100, 55/102, 108, 135, 138, 140, 154, 11, 104; 250/282–284; 373/11, 60, 77, 88, 94, 102; 204/157.22

[56] References Cited

U.S. PATENT DOCUMENTS

| 3,467,058 | 9/1969 | Box et al. | 373/11 X |
| 3,772,519 | 11/1973 | Levy et al. | 55/2 X |
| 3,944,825 | 3/1976 | Levy et al. | 55/2 X |
| 3,953,731 | 4/1976 | Forsen | 250/283 X |
| 3,973,075 | 8/1976 | Borkowski | 373/11 |
| 4,000,423 | 12/1976 | Janes et al. | 373/11 X |
| 4,035,574 | 7/1977 | Kennedy | 373/11 |
| 4,210,814 | 7/1980 | Clifford | 250/284 X |
| 4,458,148 | 7/1984 | Hirshfield et al. | 55/3 X |
| 4,636,287 | 1/1987 | Pike et al. | 204/157.22 |
| 5,025,152 | 6/1991 | Cordfunke et al. | 204/157.22 X |

FOREIGN PATENT DOCUMENTS 59597  7/1947  Netherlands ................ 373/11

Primary Examiner—Richard L. Chiesa
Attorney, Agent, or Firm—Oblon, Spivak, McClelland, Maier & Neustadt

[57] ABSTRACT

In a typical method of separating isotopes, a linear material is fed between electrodes arranged in a vacuum vessel. Joule heat is generated by supplying a current to the linear material. A vapor flow is produced by heating and evaporating the linear material. Only a specific isotope in the vapor flow is selectively ionized by radiating a laser beam on the vapor flow. The ionized isotope is separated by using at least one of electric and magnetic fields. A typical isotope separating apparatus includes a vacuum vessel, a material feeder, a power source system, a laser optical system, and an ion separating unit. The material feeder feeds a linear material containing a plurality of types of isotopes between electrodes in the vacuum vessel. The power source system supplies a current to the linear material to heat and evaporate it.

10 Claims, 15 Drawing Sheets

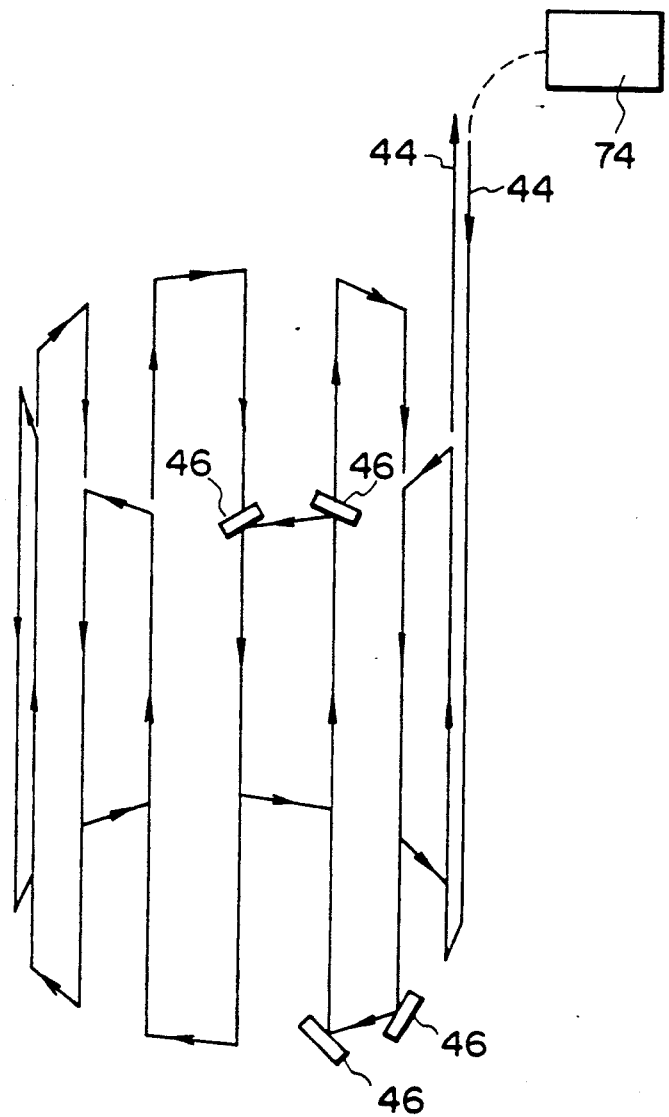
F I G. 9

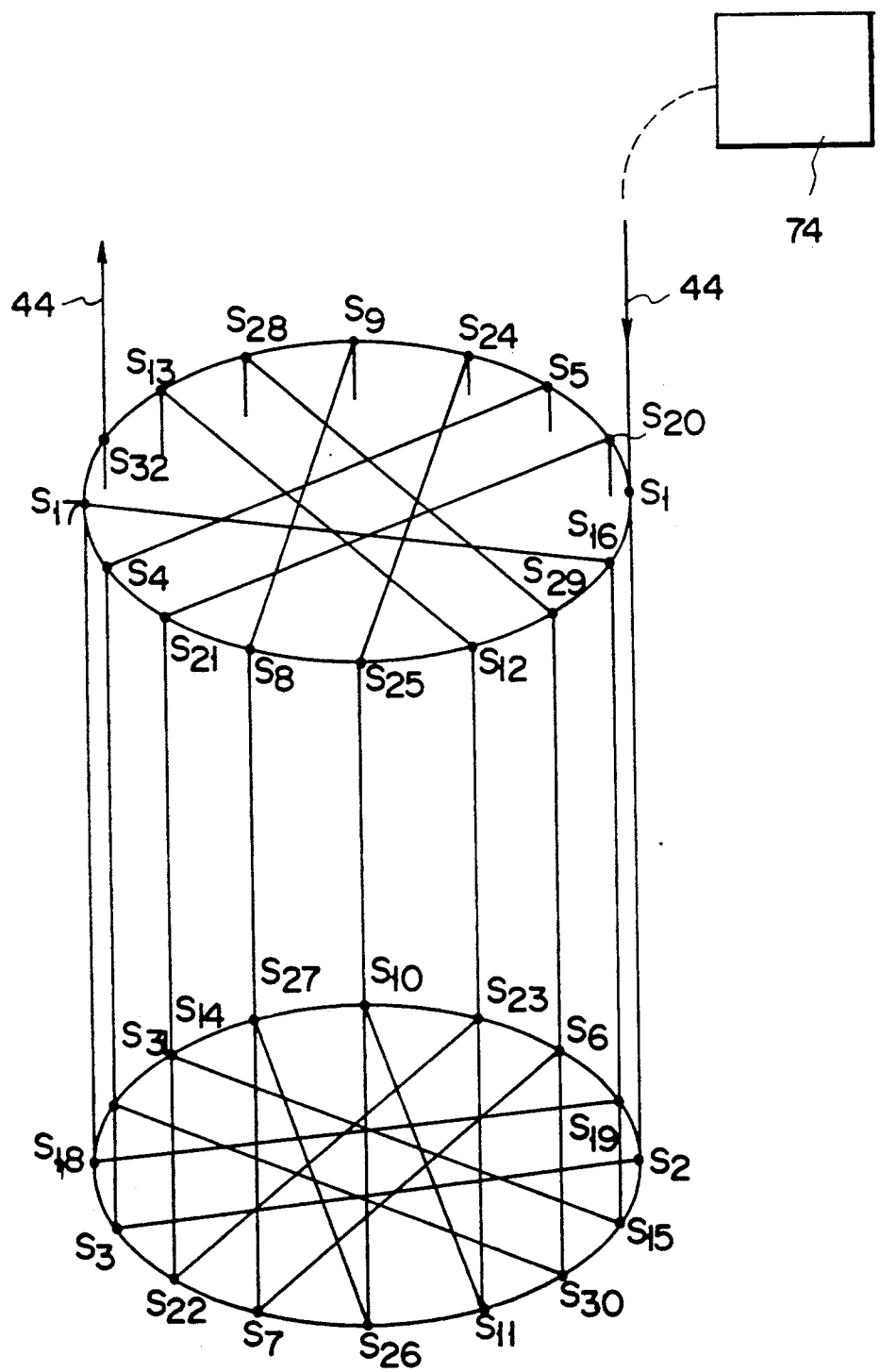
F I G. 10

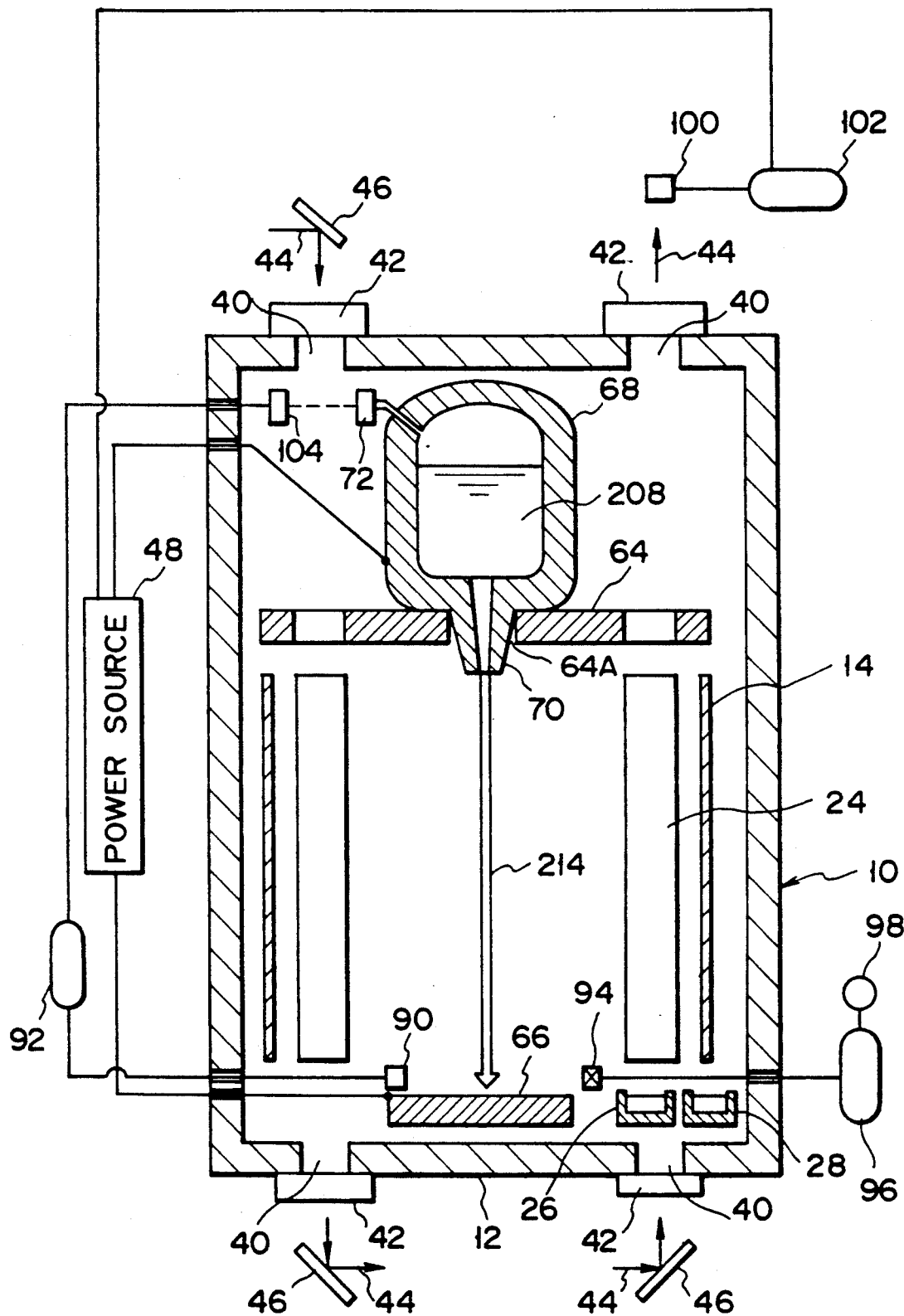
F I G. 15

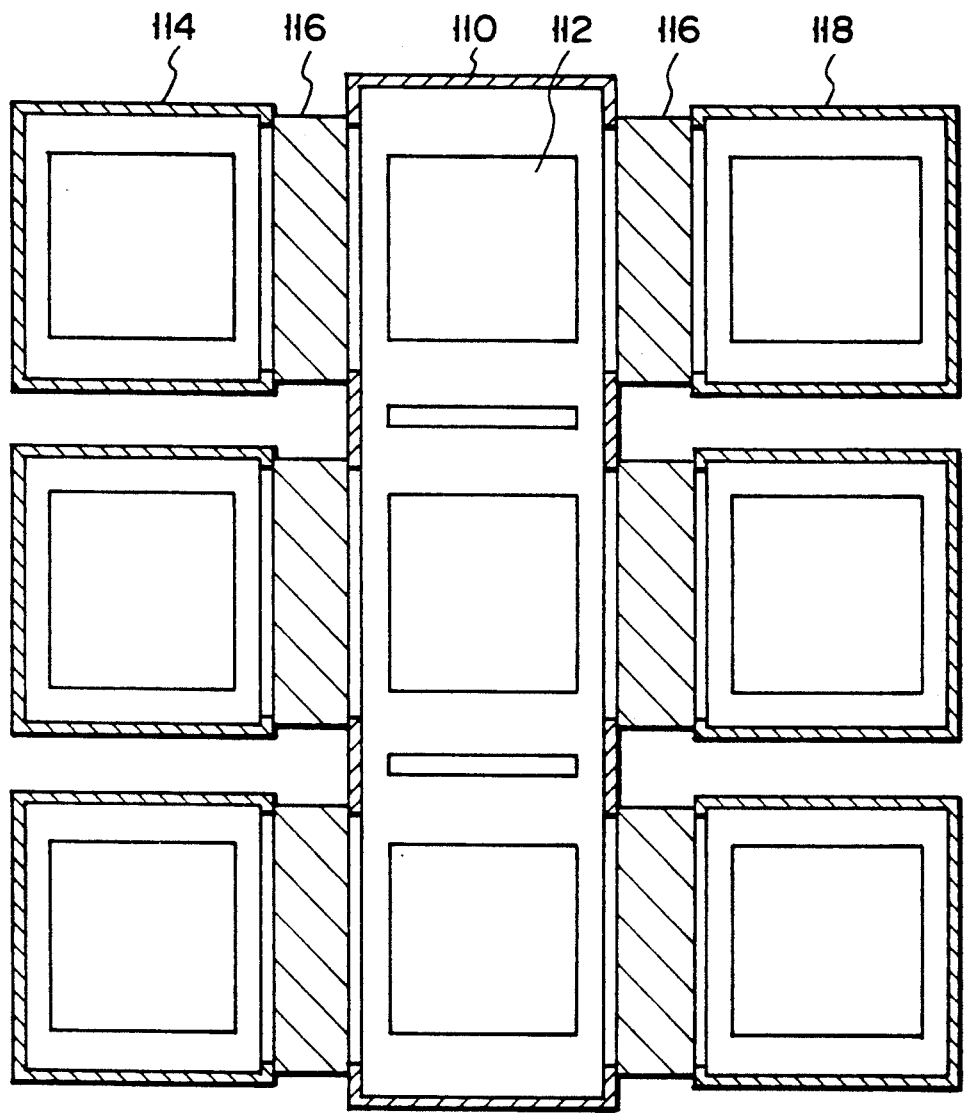
F I G. 16

METHOD AND APPARATUS FOR SEPARATING ISOTOPES

BACKGROUND OF THE INVENTION

1. Field of the Invention

The present invention relates to a method and apparatus for separating isotopes.

2. Description of the Related Art

As an isotope separation scheme, a scheme using a laser beam is available. In this isotope separation scheme using a laser beam, isotopes are selectively ionized by using a laser beam, and the ionized isotopes are electrically separated from one another.

For example, U.S. Pat. No. 4,035,574 issued to Kurt D. Kennedy discloses such an isotope separation scheme using a laser beam. The principle of this patent or other known isotope separation schemes using a laser beam will be described below. A material containing a plurality of types of isotopes is stored in a material container. This material is continuously irradiated with an electron beam emitted from an electron gun. Upon irradiation with the electron beam, the material is heated to a high temperature. The heated material is melted and evaporated. As a result, vapor flows of the isotopes are continuously produced. Thereafter, a specific isotope to be recovered is irradiated with a selected laser beam. In addition, an ionization laser beam is radiated on the specific isotope to be recovered. The specific isotope irradiated with the ionization laser beam discharges electrons to become an ionized isotope having a positive charge. This vapor flow as the ionized isotope passes through an electric field space formed between an anode and a cathode. When the isotopes pass through the electric field space only the ionized isotope is deflected to a surface of the cathode to be absorbed/recovered. On the other hand, neutral atoms such as the non-ionized isotope passes straight between the two electrodes to be recovered by a vapor recovery plate arranged behind the electrodes.

In such a conventional isotope separation scheme using a laser beam, however, the following problems are posed because a material stored in a material container is irradiated with an electron beam to be melted and evaporated.

The first problem is that the material container for holding a heated/melted material must be cooled due to limitations imposed on a material constituting the container in terms of heat resistance, corrosion resistance, and the like. For this reason, the amount of required electron beam energy is the sum of the energy amount required for melting the material and the energy amount lost in cooling of the material container. The energy amount lost in cooling of the material container is irrelevant to the object of the scheme and hence is equivalent to wasted energy.

The second problem is that part of an electron beam incident on a material surface is reflected thereby and scattered in the apparatus. For this reason, part of the electron beam does not contribute to evaporation of the material. That is, energy is not effectively utilized.

The third problem is that when a material is evaporated by using an electron beam, since a vapor generated by heating collides with the electron beam, the vapor is ionized. The ionized vapor flows between the electrodes. As a result, the ionized vapor is recovered by the effect of the electric field together with specific isotope ions. This degrades the degree of isotope separation.

As described above, in the conventional isotope separation scheme using a laser beam, since an electron beam as a heat source is used to evaporate a material, the loss of energy is large, and recovery of isotopes is adversely affected by electrons, thus posing various problems.

SUMMARY OF THE INVENTION

The present invention has been made to solve the above problems, and has as its object to provide a method and apparatus for separating isotopes, in which an improvement in energy efficiency can be realized while a high degree of separation can be achieved.

In order to achieve the above object, there is provided a method of separating isotopes, comprising:

the first step of feeding a linear material containing a plurality of types of isotopes between electrodes arranged in a vacuum vessel;

the second step of generating Joule heat by supplying a current to the linear material fed in the first step;

the third step of producing a vapor flow by heating and evaporating the linear material by using the heat generated in the second step;

the fourth step of selectively ionizing a specific isotope in the vapor flow by radiating a laser beam on the vapor flow produced in the third step; and the fifth step of separating the isotope ionized in the fourth step by using at least one of electric and magnetic fields.

In order to achieve the above object, there is provided an isotope separating apparatus comprising:

a vacuum vessel having a plurality of electrodes arranged therein;

material feed means for feeding a linear material containing a plurality of types of isotopes between the electrodes;

a power source for supplying a current to the linear material through the electrodes to heat and evaporate the linear material;

a laser optical system for radiating a laser beam on a vapor flow produced from the linear material to selectively ionize a specific isotope in the vapor flow; and ion separating means for separating the ionized isotope by applying at least one of electric and magnetic fields to the ionized isotope.

In order to achieve the above object, there is provided a method of separating isotopes, comprising:

the first step of sequentially feeding a plurality of rod-like materials between electrodes arranged in a vacuum vessel, each of the rod-like materials having a predetermined length corresponding to a distance between the electrodes and containing a plurality of types of isotopes;

the second step of generating Joule heat by supplying a current to one of the rod-like materials fed in the first step;

the third step of producing a vapor flow by heating and evaporating the rod-like material by using the heat generated in the second step;

the fourth step of selectively ionizing a specific isotope in the vapor flow by radiating a laser beam on the vapor flow produced in the third step; and the fifth step of separating the isotope ionized in the fourth step by using at least one of electric and magnetic fields.

In order to achieve the above object, there is provided an isotope separating apparatus comprising:

a vacuum vessel having a plurality of electrodes arranged therein;

material feed means for sequentially feeding a plurality of rod-like materials between the electrodes, each of the rod-like materials having a predetermined length corresponding to a distance between the electrodes and containing a plurality of types of isotopes;

a power source for supplying a current to the rod-like material through the electrodes to heat and evaporate the rod-like material;

a laser optical system for radiating a laser beam on a vapor flow produced from the rod-like material to selectively ionize a specific isotope in the vapor flow; and ion separating means for separating the ionized isotope by applying at least one of electric and magnetic fields to the ionized isotope.

In order to achieve the above object, there is provided a method of separating isotopes, comprising:

the first step of feeding a wire composed of a refractory material between electrodes arranged in a vacuum vessel;

the second step of dropping a molten material containing a plurality of types of isotopes down to the wire fed in the first step so as to cover the wire with the molten material;

the third step of generating Joule heat by supplying a current to the wire and the molten material fed in the second step;

the fourth step of producing a vapor flow by heating and evaporating the molten material by using the heat generated in the third step;

the fifth step of selectively ionizing a specific isotope in the vapor flow by radiating a laser beam on the vapor flow produced in the fourth step; and the sixth step of separating the isotope ionized in the fifth step by using at least one of electric and magnetic fields.

In order to achieve the above object, there is provided an isotope separating apparatus comprising:

a vacuum vessel having a plurality of electrodes arranged therein;

wire feed means for feeding a wire composed of a refractory material between the electrodes;

molten material feed means for dropping a molten material containing a plurality of types of isotopes down to the wire fed so as to cover the wire with the molten material;

a power source for supplying a current to the wire and the molten material through the electrodes to heat and evaporate the molten material;

a laser optical system for radiating a laser beam on a vapor flow produced from the molten material to selectively ionize a specific isotope in the vapor flow; and ion separating means for separating the ionized isotope by applying at least one of electric and magnetic fields to the ionized isotope.

In order to achieve the above object, there is provided a method of separating isotopes, comprising:

the first step of forming a molten material containing a plurality of types of isotopes into a jet and feeding the jet between electrodes arranged in a vacuum vessel;

the second step of generating Joule heat by supplying a current to the material jet fed in the first step;

the third step of producing a vapor flow by heating and evaporating the material jet by using the heat generated in the second step;

the fourth step of selectively ionizing a specific isotope in the vapor flow by radiating a laser beam on the vapor flow produced in the third step; and the fifth step of separating the isotope ionized in the fourth step by using at least one of electric and magnetic fields.

In order to achieve the above object, there is provided an isotope separating apparatus comprising:

a vacuum vessel having a plurality of electrodes arranged therein;

a crucible for storing a molten material containing a plurality of types of isotopes;

material feed means for forming the molten material in the crucible into a jet and feeding the jet between the electrodes;

a power source for supplying a current to the material jet through the electrodes to heat and evaporate the material jet;

a laser optical system for radiating a laser beam on a vapor flow produced from the material jet to selectively ionize a specific isotope in the vapor flow; and ion separating means for separating the ionized isotope by applying at least one of electric and magnetic fields to the ionized isotope.

In order to achieve the above object, there is provided an isotope separating system comprising a plurality of horizontally arranged separating units, each identical to any one of the isotope separating apparatuses described above.

In order to achieve the above object, there is provided an isotope separating system comprising a plurality of vertically arranged separating units, each identical to any one of the isotope separating apparatuses described above.

In order to achieve the above object, there is provided an isotope separating system comprising a plurality of horizontally and vertically arranged separating units, each identical to any one of the isotope separating apparatuses described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a perspective view illustrating a laser optical system as the first arrangement applied to the isotope separating apparatus according to the present invention;

FIG. 10 is a perspective view illustrating a laser optical system as the second arrangement applied to the isotope separating apparatus according to the present invention;

FIG. 15 is a longitudinal sectional view showing an isotope separating apparatus according to the eighth embodiment of the present invention, wherein a control system is additionally arranged in the apparatus of the fourth embodiment; and FIG. 16 is a view showing an arrangement of an isotope separating system formed by connecting a plurality of separating units, each identical to one of the isotope separating apparatuses of the respective embodiments of the present invention.

DETAILED DESCRIPTION OF THE PREFERRED EMBODIMENTS

Figure 1:
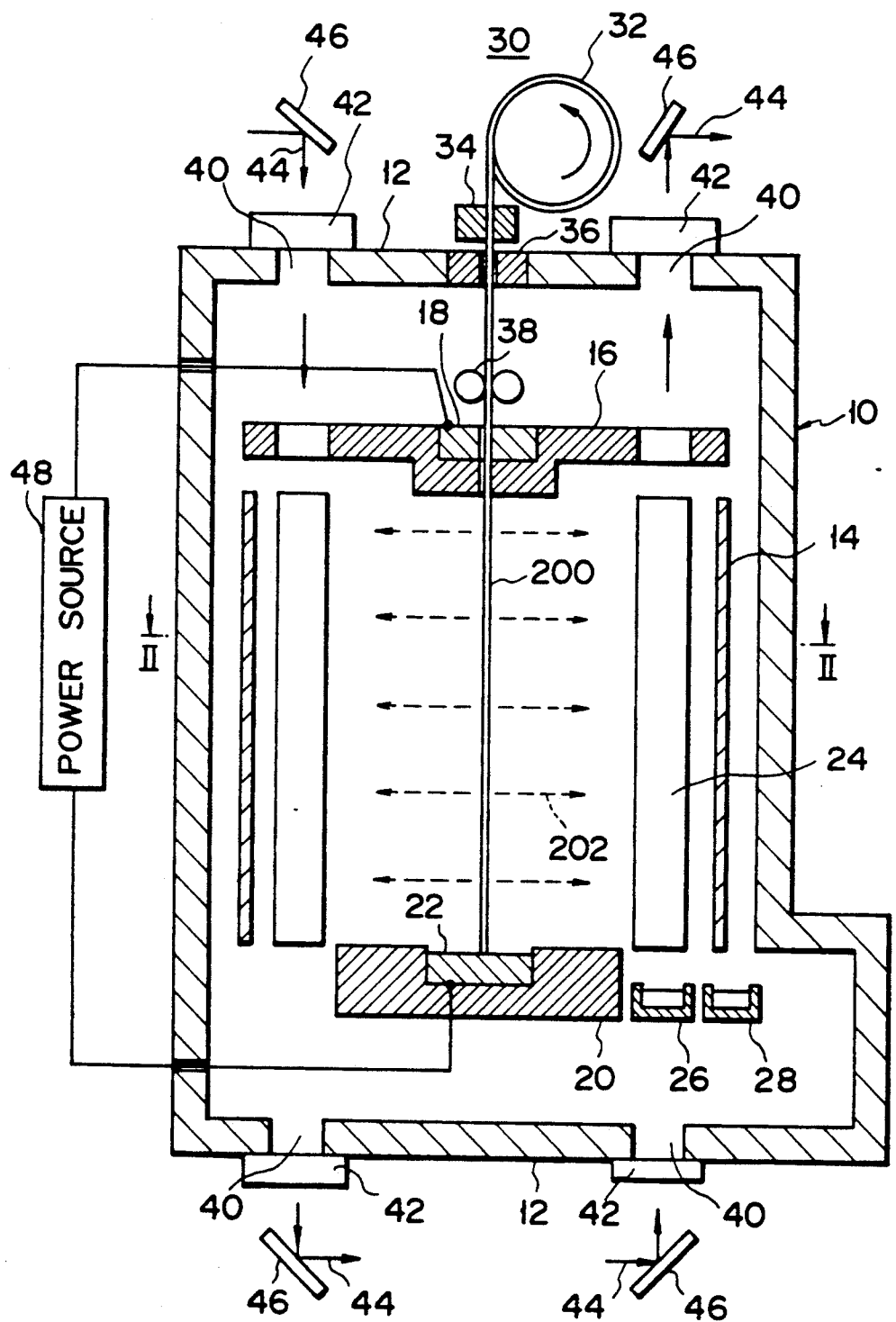
FIG. 1 is a longitudinal sectional view showing an isotope separating apparatus according to the first embodiment of the present invention.
Figure 2:
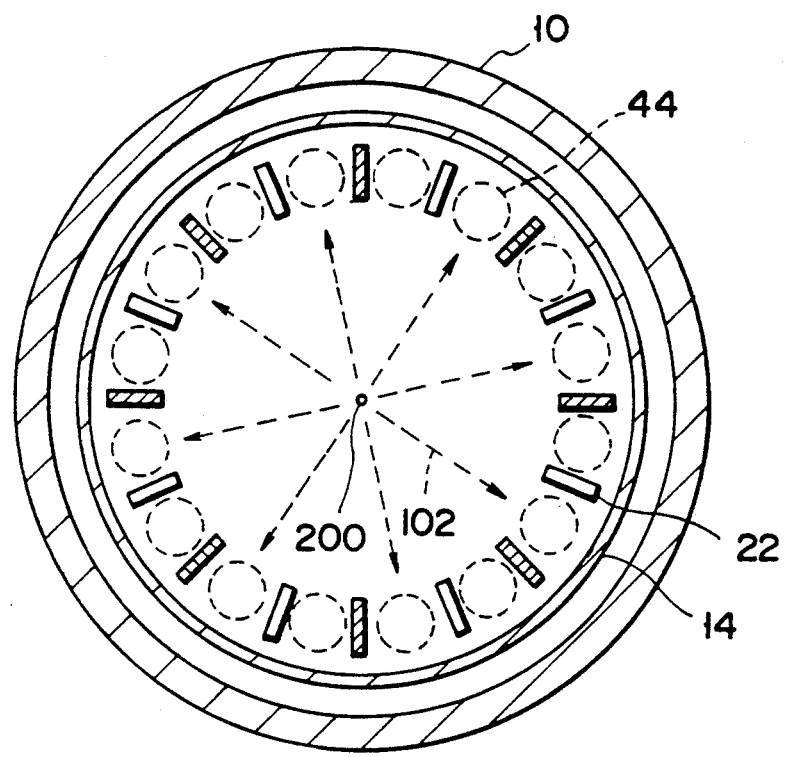
FIG. 2 is a horizontal view taken along a line II—II in FIG. 1.

The preferred embodiments of the present invention will be described below with reference to the accompanying drawings. An apparatus according to the first embodiment will be described first with reference to FIGS. 1 to 4. Referring to FIGS. 1 and 2, openings in the two ends of a cylindrical vacuum vessel 10 are respectively sealed with sealing plates 12. A cylindrical vapor recovery plate 14 is coaxially arranged in the vacuum vessel 10. The cylindrical vapor recovery plate 14 is located at a position farthest from a virtual center axis in the vacuum vessel 10. An electrode support member 16 is arranged near the upper opening of the vapor recovery plate 14. An upper electrode 18 is arranged in substantially the center of the electrode support member 16. In addition, an electrode support member 20 is arranged near the lower opening of the vapor recovery plate 14. A lower electrode 22 is arranged in substantially the center of the electrode support member 20. These upper and lower electrodes 18 and 22 are composed of a predetermined refractory material so as not to be melted even if a predetermined large current flows in the upper and lower electrodes 18 and 22 to generate heat. A plurality of electrodes plates 24 are arranged on the inner surface of the vapor recovery plate 14 to be radial with respect the center axis of the plate 14. A specific isotope recovery vessel 26 is arranged below the electrode plates 24. In addition, a recovery vessel 28 is arranged below the vapor recovery plate 14.

A wire feed mechanism 30 is arranged outside the vacuum vessel 10 at a position near the upper sealing plate 12. This wire feed mechanism 30 is constituted by a wire drum 32 and a wire feeder 34. As the wire feeder 34, a mechanical feeder utilizing the rotation of a roll or a linear motor for generating a driving force based on an electromagnetic force generated by a moving magnetic field and an induced current may be employed. A material 200 having a linear shape like a wire is wound around the wire drum 32. The linear material 200 is formed by performing a predetermined process with respect to an original material containing a plurality of types of isotopes so as to have a thin linear shape. The linear material 200 is fed into the vacuum vessel by the wire feeder 34. More specifically, a wire introducing portion 36 is formed in the center of the upper sealing plate 12. A through hole is formed in the wire introducing portion 36. The linear material 200 biased by the wire feeder 34 is fed into the vacuum vessel 10 through the through hole in the wire introducing portion 36. A non-contact type vacuum seal (not shown) is arranged in the through hole in the wire introducing portion 36. As this non-contact type vacuum seal, a means for sealing a vacuum with a magnetic fluid may be employed. The reason why the non-contact type vacuum seal is used is that a contact type vacuum seal cannot be used because the linear material 200 is moved through the through hole in the wire introducing portion 36 at a high speed. The linear material 200 fed into the vacuum vessel 10 is guided by guide rollers 38 to be vertically moved through a through hole formed in the upper electrode 18. As a result, the leading end of the linear material 200 is brought into contact with the lower electrode 22.

Windows 40 are respectively formed in peripheral portions of the upper and lower sealing plates 12 to correspond to the respective recovery electrodes 24. The windows are respectively sealed with glass members 42. With this arrangement, a laser beam 44 emitted from a laser oscillation source (not shown) can be transmitted through the glass member 42 to be introduce into the vacuum vessel 10. In addition, a plurality of reflecting mirrors 46 are respectively arranged in correspondence with the glass members 42. The reflecting mirrors 46 are arranged outside the vacuum vessel 10. As shown in FIGS. 9 and 10, with these reflecting mirrors 46, the laser beam 44 is repeatedly reflected in the circumferential or radial direction in the vacuum vessel 10. The propagation positions of the laser beam 44 in the vacuum vessel 10 are related to each other such that the laser beam 44 is radiated on a vapor flow 202 produced from the linear material 202 and having a predetermined vapor density.

A power source 48 is connected to the upper and lower electrodes 18 and 22. The power source 48 serves to supply a current to the linear material 200 when the upper and lower electrodes 18 and 22 are connected to each other through the linear material 200. As a result, Joule heat is generated from the material 200. The linear material 200 can be evaporated by this Joule heat.

An operation of the isotope separating apparatus according to the first embodiment will be described below. The linear material 200 is fed first into the vacuum vessel 10 by the wire feed mechanism 30. The linear material 200 is then vertically guided by the guide rollers 38. The linear material 200 is moved through the through hole in the upper electrode 18 at a high speed. Subsequently, the leading end of the linear material 200 is brought into contact with the lower electrode 22. With this operation, an electric circuit is formed by the power source 48, the upper electrode 18, the linear material 200, and the lower electrode 22. A large current, therefore, can be supplied to the linear material 200 from the power source 48. As a result, Joule heat is generated by the electrical resistance of the linear material 200, and the material 200 is instantaneously heated and evaporated. The evaporated material becomes the vapor flow 202 which is quickly diffused in the radial direction. At this time, the laser beam 44 emitted from the laser oscillation source (not shown) is transmitted through the glass member 42 to be introduced into the vacuum vessel 10. As shown in FIG. 9 or 10, this laser beam 44 is repeatedly reflected by the reflecting mirrors 46 in the circumferential or radial direction between the electrode plates 24. The vapor flow 202 expands as it moves in the radial direction. Therefore, the density of the vapor flow 202 is decreased in the radial direction. While the vapor flow 202 has a predetermined vapor density, the laser beam 44 is radiated onto the vapor flow 202. Upon radiation of the laser beam 44, only a specific isotope in the vapor flow 202 is ionized. Although the linear material 200 becomes the vapor flow 202 upon energization, the material 200 can be fed into the vacuum vessel 10 at a high speed by the guide rollers 38. Therefore, the electric circuit constituted by the power source 48, the upper electrode 18, the linear material 200, and the lower electrode 22 is almost always formed.

A specific ionized isotope in the vapor flow 202 is deflected/accelerated by electric and magnetic fields generated by the electrode plates 24 to be absorbed to the surfaces of the electrode plates 24. The specific isotope absorbed to the electrode plates 24 is heated to be liquified, and flows downward to be recovered in the specific isotope recovery vessel 26 arranged below the electrode plates 24.

Neutral atoms, in the vapor flow 202, which are not ionized, are absorbed to the surface of the vapor recovery plate 14 arranged around the electrode plate 24. The neutral atoms absorbed to the vapor recovery plate 14 are heated to be liquified, and flow downward to be recovered in the recovery vessel 28 arranged below the vapor recovery plate 14. The specific isotope and the neutral atoms recovered in this manner are formed into proper shapes and conveyed outside the vessels.

As described above, in the apparatus of the first embodiment, no electron beam is used to evaporate a material, but a current is supplied to the linear material 200 to heat and evaporate it by Joule heat. Therefore, the apparatus of this embodiment does not require a material vessel for holding a melted material and cooling equipment for cooling the material vessel as in the conventional apparatus. This simplifies the overall arrangement of the apparatus and prolongs the service life of the apparatus. In addition, almost all of the input energy can be used as energy for evaporating the linear material 200. Since the electrode plates 24 can be arranged at all the angles of 360° in the circumferential direction, the utilization efficiency of the vapor flow 202 can be improved. Furthermore, since no electron beam is used, no ions are generated upon collision between electrons and the vapor flow 202, and the separation performance of a specific isotope can be improved. In this embodiment, since the material feed mechanism 30 for feeding the linear material 200 is arranged outside the vacuum vessel 10, replenishment of the linear material 200 can be easily performed, and the material feed mechanism 30 can be easily maintained.

A modification of the apparatus according to the first embodiment of the present invention will be described next. The embodiment shown in FIGS. 1 and 2 employs the upper electrode 18 consisting of a solid refractory metal in order to reduce the wear and resistance of the electrode. For the same purpose, at least one of the upper and lower electrodes 18 and 22 may be composed of a molten metal as a liquid metal. In this case, at least one of the upper and lower electrodes 18 and 22 is composed of a material identical to the linear material 200 to be evaporated and is heated to a temperature higher than its melting point so as to be used in a melted state.

If at least one of the upper and lower electrodes 18 and 22 is made of a molten metal, since the linear material 200 is wet well with the molten metal, the contact resistance can be decreased, thus reducing a loss at the upper and lower electrodes 18 and 22 as a molten metal. In this case, part of the upper and lower electrodes 18 and 22 as the molten metal may be heated and evaporated. However, since the upper and lower electrodes 18 and 22 as the molten metal are composed of the same material as the linear material 200, the evaporated metal does not become an impurity. Although a small portion of the molten metal sometimes leaks downward from gaps between the linear material 200 and the electrodes, since the molten metal is composed of the same material as the linear material 200, no problems are posed. In addition, part of the upper and lower electrodes 18 and 22 as the molten metal is evaporated. However, since part of the vapor flow 202 produced from the linear material 200 is absorbed to the upper and lower electrodes 18 and 22 as the molten metal, the upper and lower electrodes 18 and 22 do not substantially wear. Furthermore, even if the upper and lower electrodes 18 and 22 are composed of a molten metal, since the vapor flow 202 produced from the linear material 200 passes by the upper and lower electrodes 18 and 22 at a high speed and in a short period of time, the upper and lower electrodes 18 and 22 as the molten metal are not melted. In this embodiment, if the linear material 200 is made of a uranium, at least one of the upper and lower electrodes 18 and 22 is made of a specific material such as a tungsten, a molybdenum, or an iridium.

Figure 3:
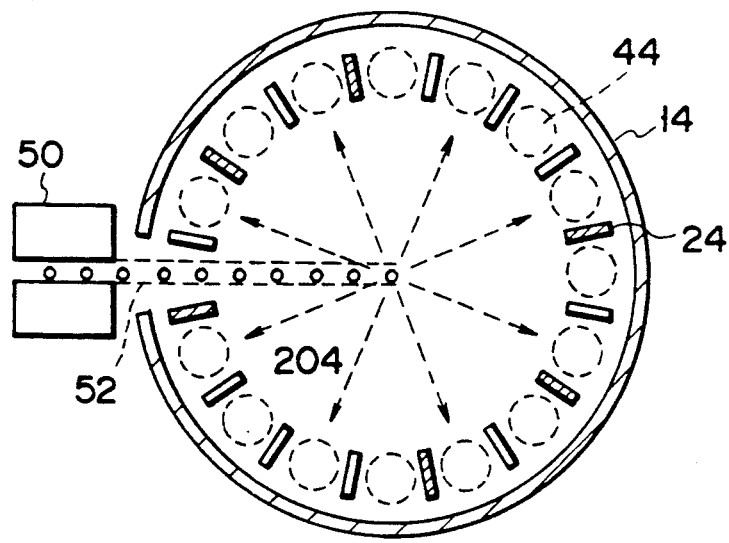
FIG. 3 is a horizontal sectional view showing an arrangement of a wire material feed mechanism in an apparatus according to the second embodiment of the present invention.
Figure 4:
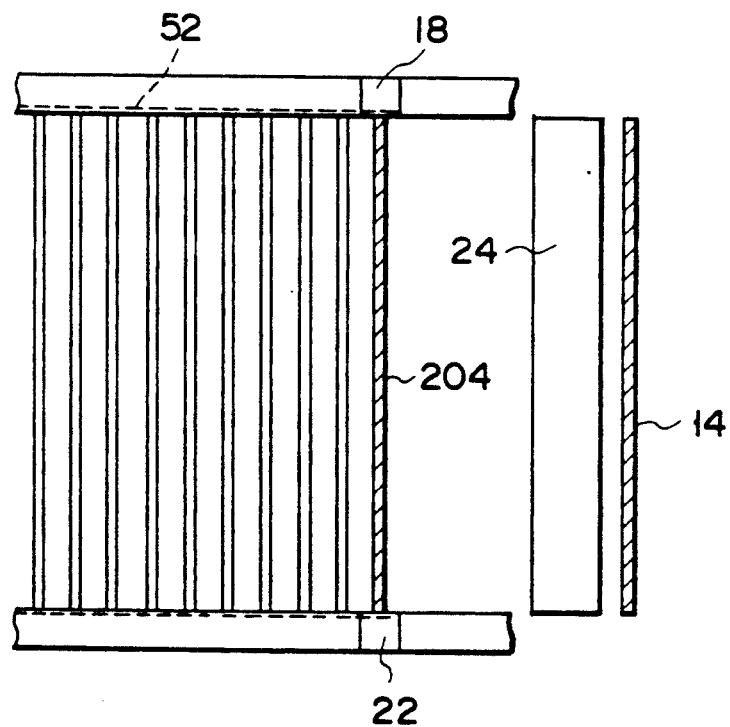
FIG. 4 is a longitudinal sectional view showing a relationship between a wire material and upper and lower electrodes in the apparatus according to the second embodiment of the present invention.

An apparatus according to the second embodiment of the present invention will be described below with reference to FIGS. 3 and 4. In the embodiment shown in FIGS. 1 and 2, the material feed mechanism 30 is arranged above the vacuum vessel 10. With this arrangement, the wire- or rod-like material 200 is externally fed into the vacuum vessel 10. In contrast to this, in the embodiment of the second embodiment shown in FIGS. 3 and 4, a material feed mechanism 50 is arranged inside the vacuum vessel 10 to be located to a side of a vapor recovery plate 14. In this material feed mechanism 50, a plurality of wire- or rod-like materials 204, each having a predetermined length, are arranged to be parallel with each other in the vacuum vessel 10. The material feed mechanism 50 has a slide mechanism 52 for sequentially moving the wire- or rod-like materials 204 in the horizontal direction. The wire- or rod-like materials 204 are sequentially moved horizontally. With this operation, the wire- or rod-like materials 204 are sequentially fed onto the center axis. In this case, when one of the wire- or rod-like materials 204 reaches a lower electrode 22, a current is supplied from a power source 48, and the wire- or rod-like material 204 is heated and evaporated in the same manner as described above.

In such a material feed scheme, since the predetermined upper and lower positions of the wire- or rod-like materials 204 are ensured in advance, the materials 204 are simply moved in the horizontal direction during a power ON operation. Therefore, the time required for the replenishment of the wire- or rod-like materials 204 can be shortened.

Figure 5:
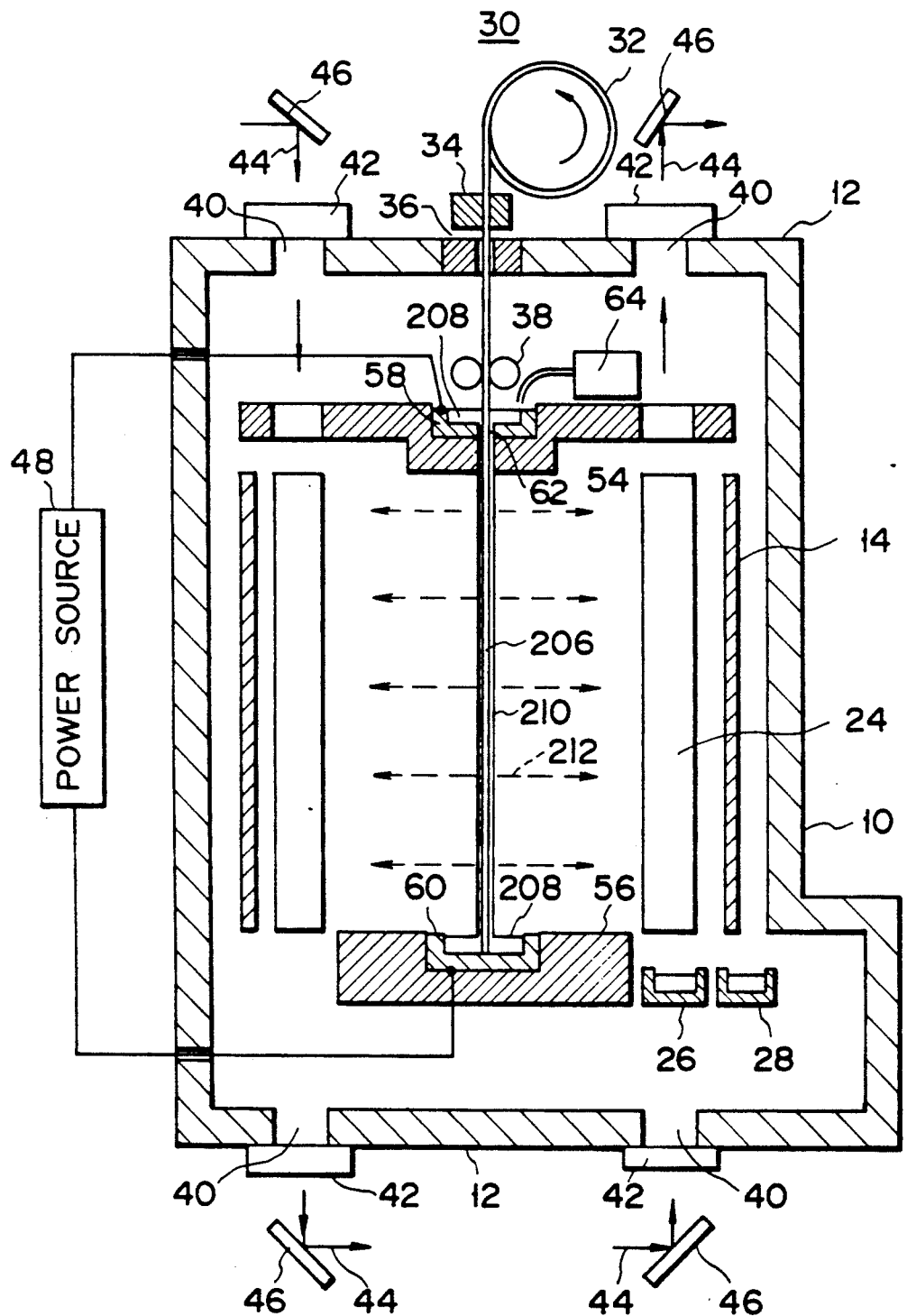
FIG. 5 is a longitudinal sectional view showing an isotope separating apparatus according to the third embodiment of the present invention.
Figure 6:
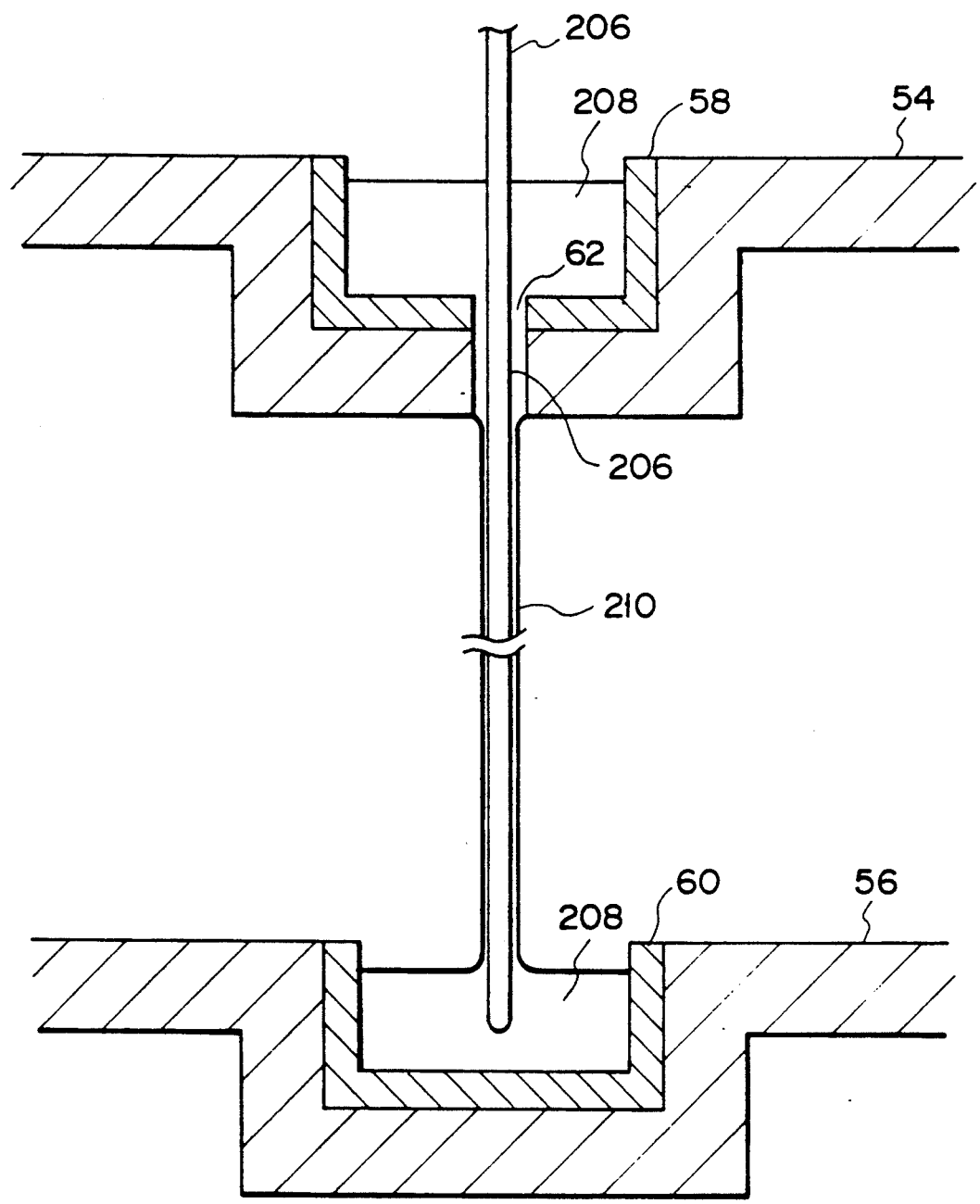
FIG. 6 is a view showing a main part of the apparatus according to the third embodiment.

An apparatus according to the third embodiment of the present invention will be described below with reference to FIGS. 5 and 6. The apparatus of the third embodiment is characterized by its material feed scheme A material feed mechanism 30, substantially identical to the mechanism in the first embodiment, feeds a refractory wire 206 into a vacuum vessel 10 instead of feeding the linear material 200. The wire 206 serves only as a guide for allowing a liquid material 208 such as liquid uranium to flow. The wire 206 is composed of a material (to be described later) having heat resistance, i.e., resistance to Joule heat. Upper and lower electrode support plates 54 and 56 are arranged in the vacuum vessel 10. An upper material vessel 58 used for storing the liquid material and serving as an upper electrode is arranged in substantially the center of the upper electrode support plate 54. In addition, a material feed system 64 is arranged to feed the liquid material 208 to the upper material vessel 58. A lower material vessel 60 as a lower electrode is arranged in substantially the center of the lower electrode support plate 56. A through hole 62 is formed in substantially the centers of the upper electrode support plate 54 and the upper material vessel 58. The diameter of this through hole 62 is larger than that of the wire 204. Therefore, the leading end of the wire 206 can reach the lower electrode vessel 60 through the upper material vessel 58 and the through hole 62. The liquid material 208 stored in the upper material vessel 58 flows downward into the lower material vessel 60 while covering the wire 206. In this case, a portion, of the liquid material 208, which covers the wire 206 is called a film-like material 210.

According to the apparatus of the third embodiment, the wire 206 is fed first into the vacuum vessel 10 by the wire feed mechanism 30. The wire 206 is vertically guided by guide rollers 38. The wire 206 passes through the through hole 62 of the upper electrode 58 at a high speed. The leading end of the wire 206 is then brought into contact with the lower electrode 60. As a result, an electric circuit is constituted by a power source 48, the upper electrode 58, the wire 206, the film-like material 210, and the lower electrode 60. Therefore, a large current can be supplied from the power source 48 to the wire 206 and the film-like material 210. Joule heat is then generated due to the electrical resistances of the wire 206 and the film-like material 210, and hence the wire 206 and the film-like material 210 are instantaneously heated and evaporated. The evaporated film-like material 210 becomes a vapor flow 212 which is quickly diffused in the radial direction. The subsequent phenomenon is the same as that in the apparatus of the first embodiment. Although part of the wire 206 may be burnt out, a new portion, of the wire 206, corresponding to the burnout portion can be fed into the vacuum vessel 10 at a high speed by the guide rollers 38. Therefore, the electrical circuit constituted by the power source 48, the upper electrode 58, the wire 206, the film-like material 210, and the lower electrode 60 is almost always formed.

Figure 7:
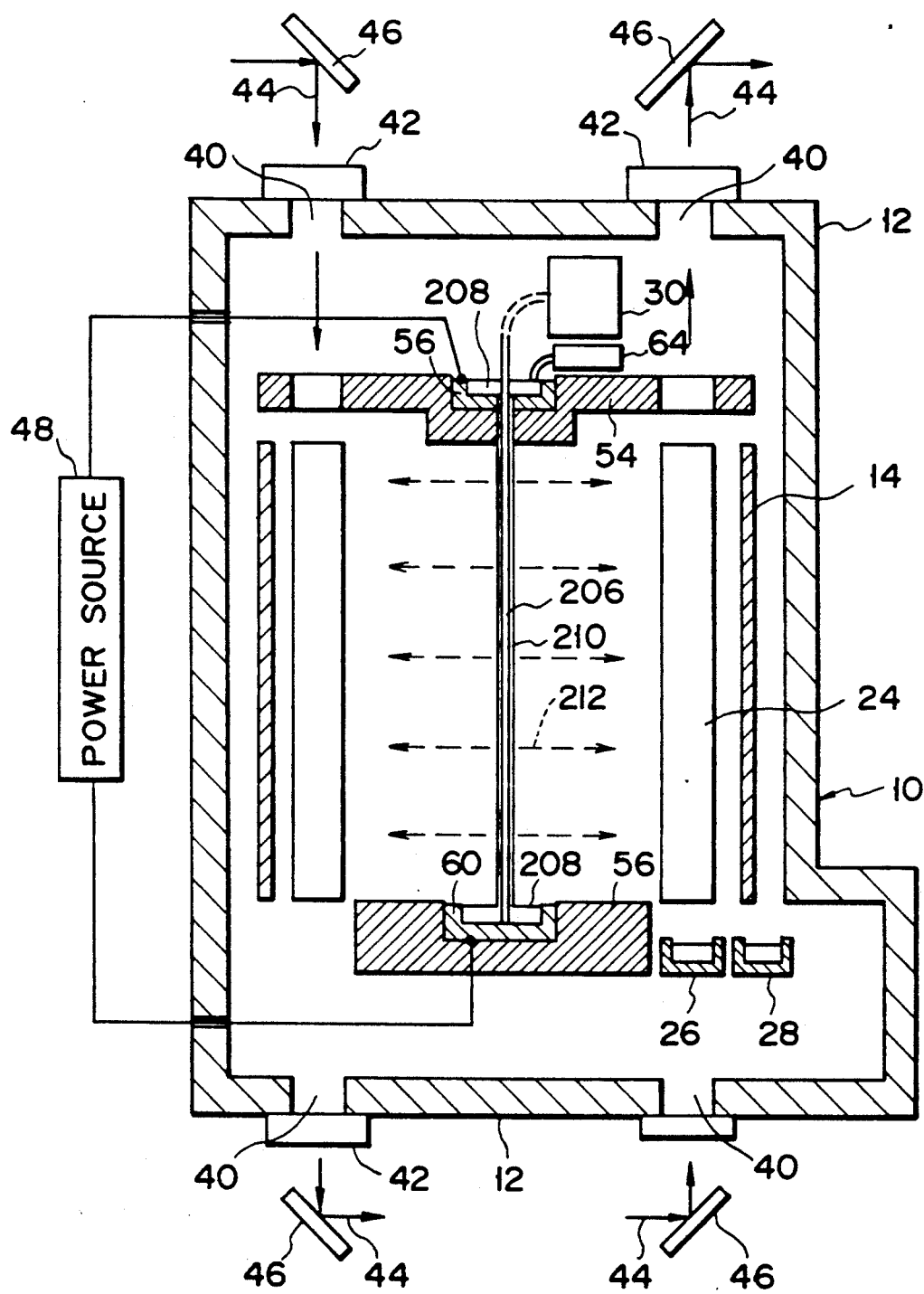
FIG. 7 is a longitudinal sectional view showing a modification of the apparatus of the third embodiment of the present invention, more specifically an arrangement in which a material feed mechanism is placed outside a vacuum vessel.

A modification of the apparatus according to the third embodiment of the present invention will be described below with reference to FIG. 7. In this modification, both the wire feed mechanism 30 and the material feed system 64 are arranged inside the vacuum vessel 10.

Figure 8:
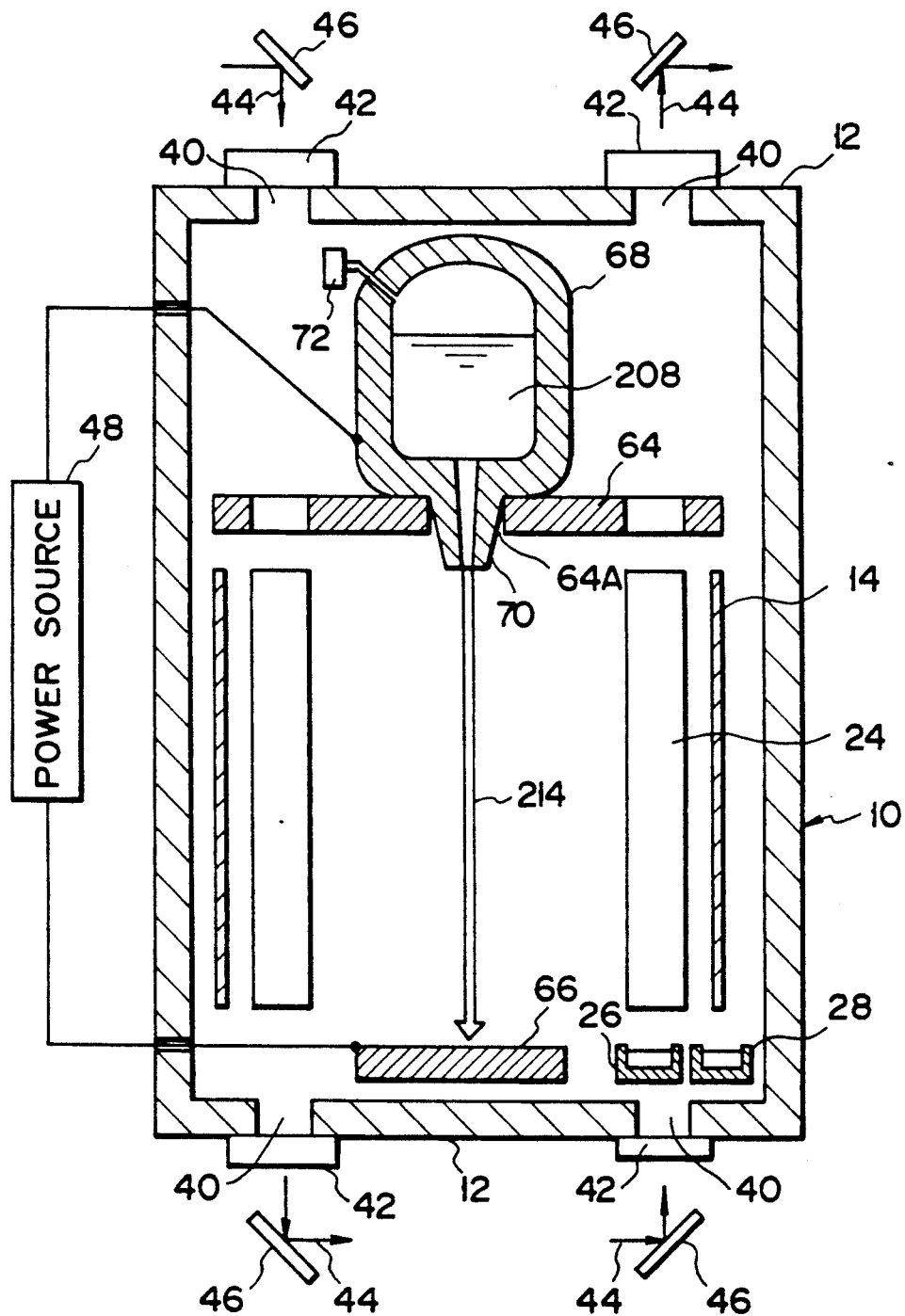
FIG. 8 is a longitudinal sectional view showing an apparatus for separating isotopes according to the fourth embodiment of the present invention.

An apparatus according to the fourth embodiment of the present invention will be described below with reference to FIG. 8. In each embodiment described above, a material containing a plurality of types of isotopes is processed into a linear material, and the linear material is fed between the upper and lower electrodes arranged at predetermined positions. In contrast to this, in the apparatus of the fourth embodiment, an upper electrode support member 64 and a lower electrode 66 are arranged in a vacuum vessel 10, as shown in FIG. 8. A through hole 64A is formed in substantially the center of the upper electrode support member 64. A crucible 68 is arranged on the upper electrode support member 64. A nozzle 70 is formed at an end portion of the crucible 68. The nozzle 70 is placed in the through hole 64A. A molten material 208 is stored in the crucible 68. This molten material 208 is jetted out from the nozzle 70. A current is supplied to a material jet 214 to evaporate it.

The apparatus of the fourth embodiment will be described in more detail below. A material containing a plurality of types of isotopes is heated and melted in the crucible 68 arranged at an upper position in the vacuum vessel 10. When the crucible 68 is internally pressurized by a pressurizing unit 72 attached to the crucible 68, the molten material 208 is jetted out of the nozzle 70. Note that the crucible 68 and the nozzle 70 serve as an upper electrode. When the material jet 214 reaches the lower electrode 66 in the vacuum vessel 10, a current is supplied from a power source 48, and the material jet 214 is instantaneously evaporated. In this case, since the material jet 214 is continuously jetted out of the nozzle 70, evaporation intervals are determined by the speed at which the material jet 214 passes between the electrodes.

According to such a jet scheme isotope separating apparatus of the fourth embodiment, a material can be supplied at a high speed to improved the driving efficiency. In addition, since no mechanical unit for feeding a material is required, the structure of the apparatus can be simplified, and the apparatus can be greatly improved in terms of service life and reliability.

In each embodiment described above, when a linear material reaches the lower electrode, the linear material is brought into electrical contact with the lower electrode, so that an electrical circuit is constituted by the crucible 68 and the nozzle 70 serving as the upper electrode, the lower electrode 66, and the material jet 214. In contrast to this, a switch (not shown) may be arranged on the power source side so that an electrical circuit is formed by ON/OFF-controlling the switch after it is confirmed that a material reaches from the crucible 68 and the nozzle 79 serving as the upper electrode to the lower electrode 66.

A laser optical system as the first arrangement used for the isotope separating apparatus of the present invention will be described below with reference to FIG. 9. In the laser optical system as the first arrangement shown in FIG. 9, a laser beam 44 generated by a laser generator 74 is introduced into a vacuum vessel 10. The laser beam 44 is reflected by reflecting mirrors 46 to propagate in the vessel 10 while its propagation position is changed in the circumferential direction, as shown in FIG. 9.

In such a laser beam radiation scheme, since the propagation position of the laser beam 44 can be finely changed in substantially the circumferential direction, the utilization efficiency of the laser beam 44 can be greatly improved.

A laser optical system as the second arrangement used for the isotope separating apparatus of the present invention will be described below with reference to FIG. 10. In the laser optical system as the second arrangement shown in FIG. 10, a laser beam 44 generated by a laser generator 74 is introduced into a vacuum vessel 10. As shown in FIG. 10, this laser beam 44 is reflected by reflecting mirrors 46 to propagate in the vacuum vessel 10 while its propagation position is sequentially changed in the radial direction. The laser beam 44 is radiated in accordance with reference symbols S1 to S31 in FIG. 10. The second arrangement of such a laser radiation scheme can be realized by changing the positions of the reflecting mirrors 46 in the first arrangement.

In this laser radiation scheme, since the propagation positions of the laser beam 44 can be finely changed in the radial direction, the utilization efficiency of the laser beam 44 can be greatly improved.

Figure 11:
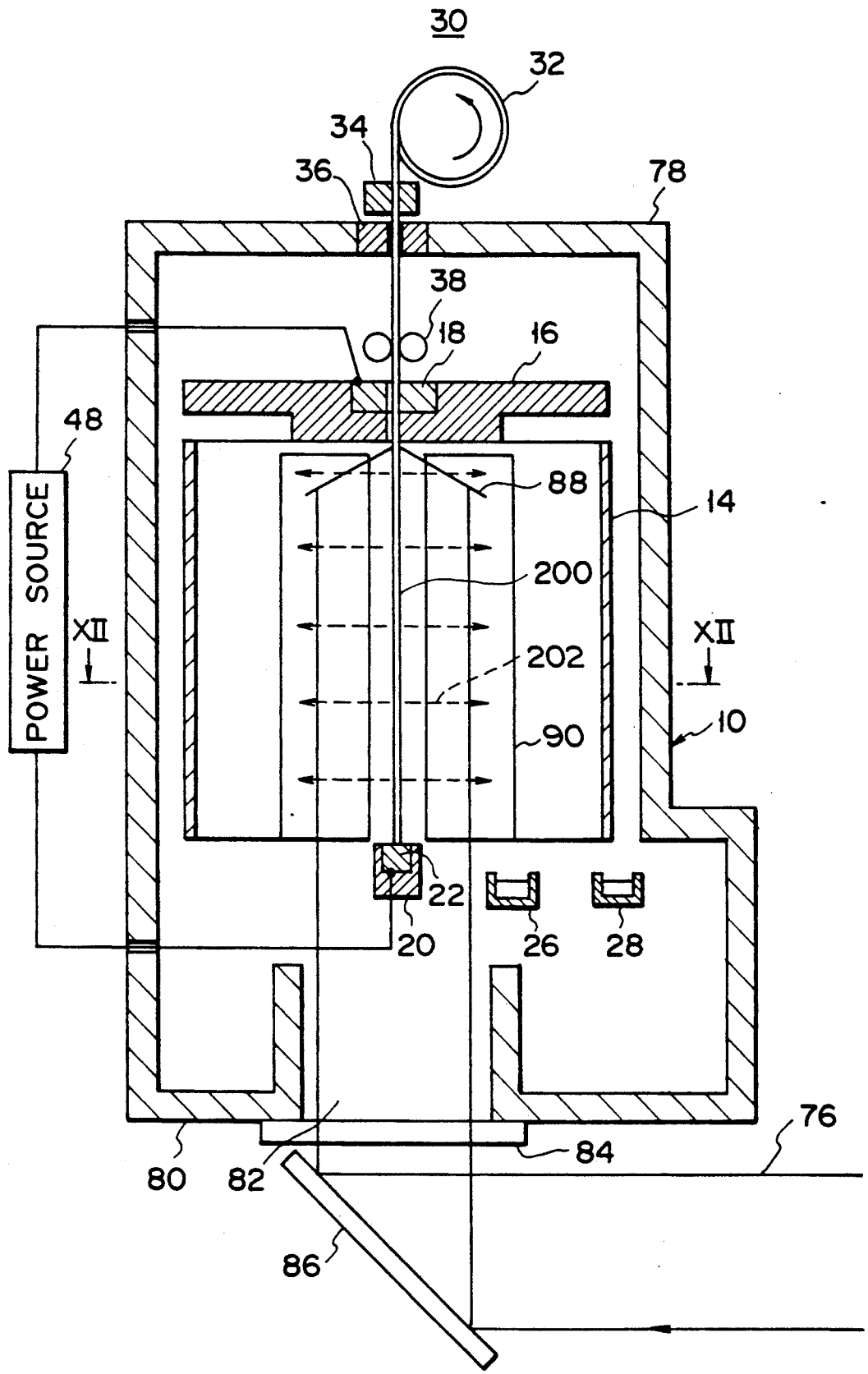
FIG. 11 is a longitudinal sectional view showing an isotope separating apparatus according to the fifth embodiment of the present invention, wherein a laser optical system as the third arrangement is applied to the apparatus of the first embodiment.
Figure 12:
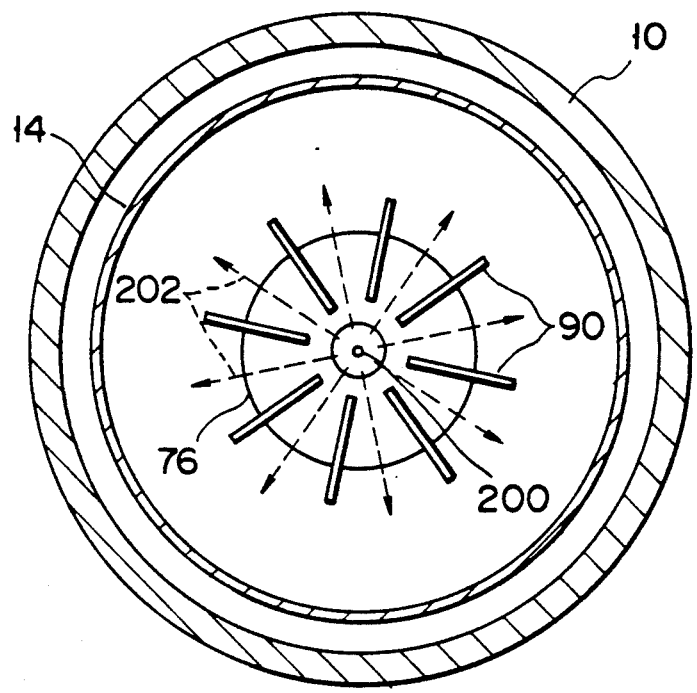
FIG. 12 is a horizontal sectional view taken along a line XII—XII in FIG. 11.

An apparatus according to the fifth embodiment of the present invention will be described below with reference to FIGS. 11 and 12. The apparatus of the fifth embodiment is obtained by combining a laser optical system as the third arrangement with the apparatus of the first embodiment. In the laser optical systems as the first and second arrangements, a plurality of propagation paths of the laser beam 44 are formed in the vacuum vessel 10. The propagation paths of the laser beam 44 are formed in the circumferential or radiation direction. In the laser optical system as the third arrangement, a thick laser beam 76 having a circular cross section is introduced into a vacuum vessel 10. Referring to FIGS. 11 and 12, the upper opening of the cylindrical vacuum vessel 10 is sealed with an upper sealing plate 78. The upper sealing plate 78 has no window through which a laser beam is transmitted. The lower opening of the vacuum vessel 10 is sealed with a lower sealing plate 78. A large window 82 is formed in substantially the center of the sealing plate 78. This large window 82 is tightly sealed with a glass member 82. A reflecting plate 86 is arranged to oppose the large window 82. Reflecting plates 86 are arranged on an upper electrode support member 16 in the vacuum vessel 10. Similar to the first embodiment, a cylindrical vapor recovery plate 14 is coaxially arranged in the vacuum vessel 10. The cylindrical vapor recovery plate 14 is located at a position farthest from a virtual center axis in the vacuum vessel 10. An upper electrode 18 is arranged in substantially the center of the electrode support member 16. In addition, an electrode support member 20 is arranged near the lower opening of the recovery plate 14. A lower electrode 22 is arranged in substantially the center of the electrode support member 20. These upper and lower electrodes 18 and 22 are composed of a predetermined refractory material so as not be melted even if a predetermined large current flows in the upper and lower electrodes 18 and 22 and heat is generated. In addition, at the inner surface of the vapor recovery plate 14, a plurality of electrode plates 90 are radially arranged with respect to the center axis of the vapor recovery plate 14. A specific isotope recovery vessel 26 is arranged below the electrode plates 90. A recovery vessel 28 is arranged below the vapor recovery plate 14. The electrode plates 90 have a width larger than that of the electrode plates in the apparatus of the first embodiment, and are arranged near a linear material 200. Other structures are the same as those of the apparatus of the first embodiment. In this embodiment, if the linear material 200 is made of a uranium, at least one of the upper and lower electrodes 18 and 22 is made of a specific material such as a tungsten, a molybdenum, or an iridium.

The same effects as those in the first embodiment can be obtained by the apparatus of the fifth embodiment. The apparatus of the fifth embodiment, however, has the following advantage which the laser optical systems as the first and second arrangements do not have. In the laser optical system as the third arrangement, only one pair of a glass member and a reflecting mirror is used. In contrast to this, a plurality of pairs of glass members and reflecting mirrors are used in the laser optical systems as the first and second arrangements. In the laser optical system as the third arrangement, therefore, the attenuation amount of laser beam during propagation is much smaller than that in the laser optical systems as the first and second arrangements. This means that the utilization efficiency of a laser beam in the apparatus of the fifth embodiment is improved compared with the apparatus of the first embodiment.

Figure 13:
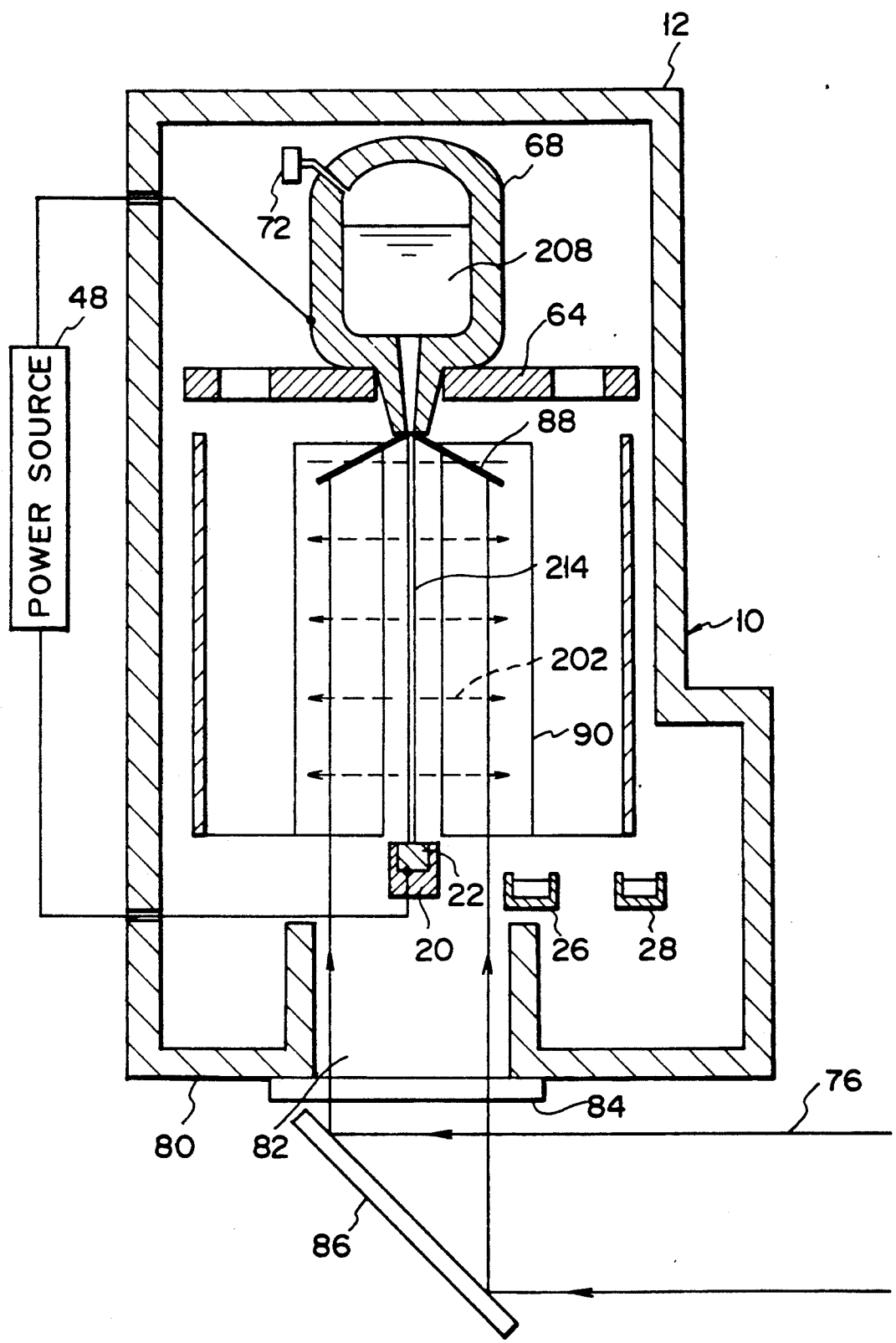
FIG. 13 is a longitudinal sectional view showing an isotope separating apparatus according to the sixth embodiment, wherein the laser optical system as the third arrangement is applied to the apparatus of the fourth embodiment.

An apparatus according to the sixth embodiment of the present invention will be described below with reference to FIG. 13. The apparatus of the sixth embodiment is constituted by a combination of the apparatus of the fourth embodiment and the laser optical system as the third arrangement. It is apparent that the utilization efficiency of a laser beam in the apparatus of the sixth embodiment is improved as compared with the apparatus of the fourth embodiment.

Figure 14:
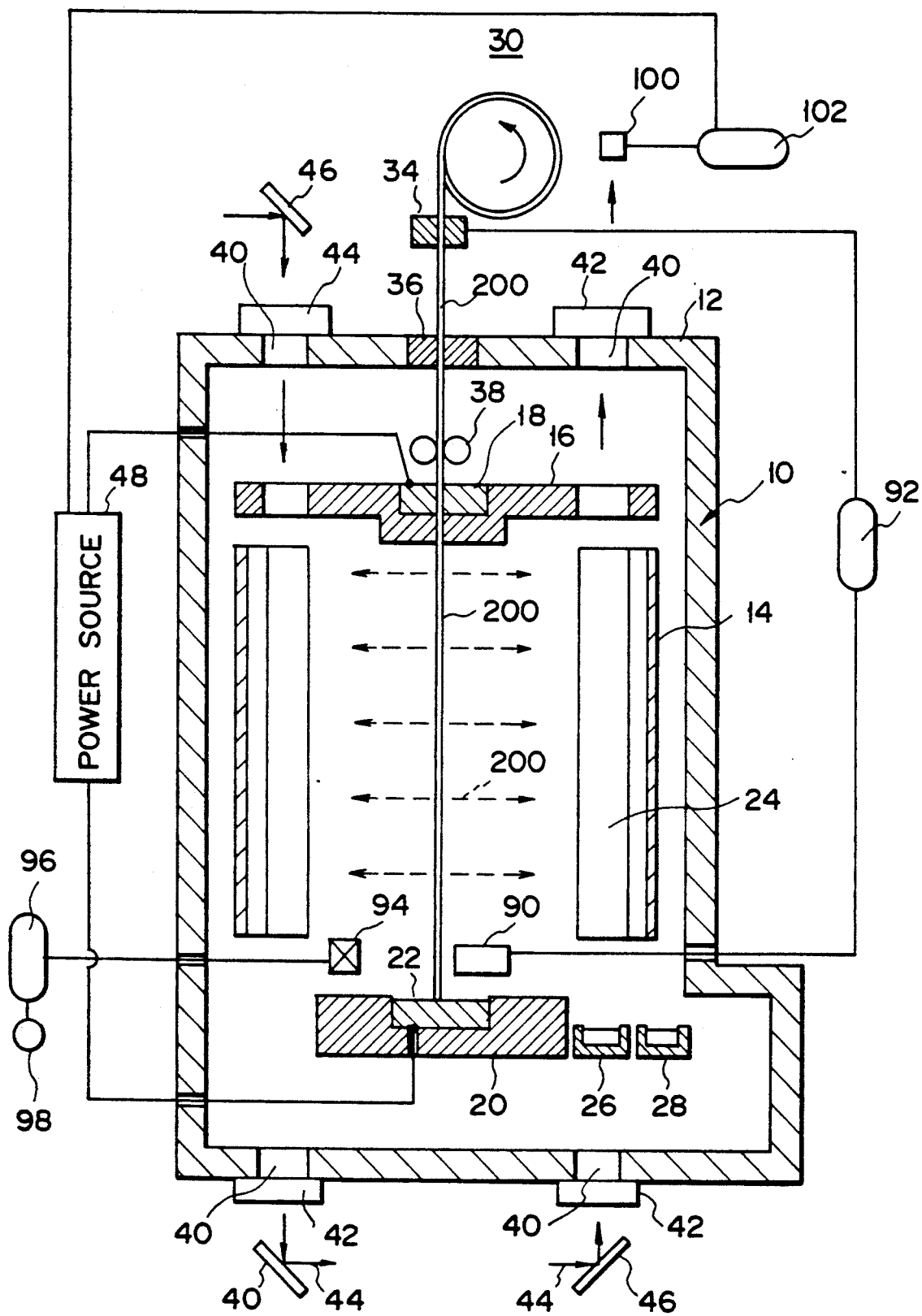
FIG. 14 is a longitudinal sectional view showing an isotope separating apparatus according to the seventh embodiment of the present invention, wherein a control system is additionally arranged in the apparatus of the first embodiment.

An apparatus according to the seventh embodiment of the present invention will be described below with reference to FIG. 14. The apparatus of the seventh embodiment is constituted by a combination of the apparatus of the first embodiment and a new optical system. A sensor 90 for detecting the remaining amount of a linear material 200 is arranged near a lower electrode 22. An output from the sensor 90 is supplied to a controller 92. The controller 92 controls a wire feed unit 34 in accordance with the output from the sensor 90. This control is performed such that the linear material 200 always exists between an upper electrode 18 and the lower electrode 22. In addition, a sensor 84 for detecting the density of a vapor flow 202 is arranged in a space between the upper and lower electrodes 18 and 22. An output from the sensor 94 is supplied to a controller 96. The controller 96 causes an alarm 98 to generate an alarm sound when the output from the sensor 94 is smaller than a predetermined value. That is, an alarm sound is generated when the density of the vapor flow 202 is lower than the predetermined value. Furthermore, a sensor 100 for detecting the amount or intensity of a laser beam 44 is arranged outside a window 40 of a vacuum vessel 10. The sensor 100 is preferably placed at the end of the downstream side of the propagation path of the laser beam 44 shown in FIGS. 9 and 10. An output from the sensor 100 is supplied to a power source 48. The power source 48 increases its output voltage when the output from the sensor 100 is larger than a predetermined value, and vice versa. With this operation, the vapor flow 202 corresponding to the amount or intensity of the laser beam 44 can be fed. This operation is a countermeasure against the downward tendency of the output of the laser generator over time. Note that the sensor for detecting the remaining amount of the linear material 200 and its control system, the sensor 94 for detecting the density of the vapor flow 202 and its control system, and the sensor 100 for detecting the amount or intensity of the laser beam 4 and its control system can be independently operated or integrally operated.

An apparatus according to the eighth embodiment of the present invention will be described below with reference to FIG. 15. The apparatus of the eighth embodiment is constituted by a combination of the apparatus of the fourth embodiment and a new control system. A sensor for detecting the remaining amount of a linear material 200 is arranged near a lower electrode 22. An output from the sensor 90 is supplied to a controller 92. The controller 92 controls a driving unit 104 for a pressurizing unit 72 in accordance with the output from the sensor 90. This control is performed such that a material jet 214 always exists between an upper electrode 18 and the lower electrode 22. A sensor 94 for detecting the density of a vapor flow 202, and a sensor 100 for detecting the amount or intensity of a laser beam 44 are the same a those in the apparatus of the seventh embodiment.

In each embodiment described above, the isotope separating apparatus as a single unit is disclosed. In practice, however, such an isotope separating apparatus is considered as a single separating unit, and a system constituted by a plurality of separating units stacked on each other is used.

FIG. 16 is an elevation view showing an arrangement of such a system as a whole. As shown in FIG. 16, this system includes a separation chamber vacuum vessel 110. The separation chamber vacuum vessel 110 has inlet handling chambers 114. Each inlet handing chamber 114 serves as a preliminary chamber for loading a separation module 112 in the separation chamber vacuum vessel 110. Each separation module 112 is arranged in the separation chamber vacuum vessel 110 through a corresponding vacuum valve 116. New separation modules 112 for replacement are respectively stored in the inlet handling chambers 114. After the separation modules 112 are stored in the inlet handling chambers 114, the chambers 114 are evacuated to be set in a standby state. In addition, outlet handling chambers 118 are arranged on the opposite side of the separation chamber vacuum vessel 110 through vacuum valves 116. Only the separation modules 112 which require maintenance can be withdrawn from the separation chamber vacuum vessel 110 to be stored in the outlet handling chambers 118.

As described above, in the system shown in FIG. 16, since a plurality of separation modules are connected to each other in the lateral and longitudinal directions, maintenance can be performed in units of the separation modules 112 without opening the separation chamber vacuum vessel 110 to the open air.

In the above embodiment, a plurality of separating units are stacked on each other. However, FIG. 16 may be regarded as a plan view. In this case, a system is designed such that a plurality of separating units are horizontally arranged. In addition, a plurality of separating units may be horizontally arranged to constitute one module, and a plurality of modules may be stacked on each other to constitute a system.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of separating isotopes, comprising the steps of:
   feeding a linear material containing a plurality of types of isotopes between an upper electrode and a lower electrode arranged in a vacuum vessel;
   generating Joule heat by employing the upper and lower electrodes and supplying a current to the linear material;
   producing a vapor flow by heating and evaporating the linear material by using the generated Joule heat;
   selectively ionizing a specific isotope in the vapor flow by radiating a laser beam, produced by a laser optical system arranged outside of said vacuum vessel, on the vapor flow; and
   separating the ionized isotope by using means for generating at least one of electric and magnetic fields, wherein said means for generating is arranged at the inner surface of said vacuum vessel.

2. An isotope separating apparatus comprising:
   a vacuum vessel having an inner surface portion, an upper electrode arranged near an upper portion of the vacuum vessel and a lower electrode arranged near a lower portion of the vacuum vessel;
   material feed means, arranged outside of the vacuum vessel near said upper portion, for feeding a linear material containing a plurality of types of isotopes between said upper and lower electrodes;
   a power source, arranged outside of the vacuum vessel, for supplying a current to the linear material through said upper and lower electrodes to heat and evaporate the linear material;
   a laser optical system, arranged outside of the vacuum vessel, for radiating a laser beam on a vapor flow produced from the linear material to selectively ionize a specific isotope in the vapor flow; and
   ion separating means, arranged near the inner surface portion of the vacuum vessel, for separating the ionized isotope by applying at least one of electric and magnetic fields to the ionized isotope.

3. An apparatus according to claim 2, wherein said laser optical system comprises a laser beam generator and an optical system for introducing a laser beam into said vacuum vessel.

4. An apparatus according to any one of claims 2 and 3, wherein said laser optical system forms a large number of propagation paths in said vacuum vessel in a circumferential direction.

5. An apparatus according to any one of claims 2 and 3, wherein said laser optical system forms a large number of propagation paths in said vacuum vessel in a radial direction.

6. An apparatus according to any one of claims 2 and 3, wherein said laser optical system introduces one large-diameter laser beam into said vacuum vessel.

7. An apparatus according to claim 2, further comprising:
   a sensor for detecting a remaining amount of the linear material between said electrodes;
   a sensor for detecting at east one of an amount and an intensity of a laser beam radiated on the vapor flow;
   a sensor for detecting a density of the vapor flow; and
   control means for performing at least one of a supply operation of the linear material, adjustment of a voltage of said power source, and alarm control for informing a decrease in density of the vapor flow in accordance with outputs from said respective sensors.

8. An isotope separating system comprising a plurality of horizontally arranged separating units, each identical to said isotope separating apparatus of claim 2.

9. An isotope separating system comprising a plurality of vertically arranged separating units, each identical to said isotope separating apparatus of claim 2.

10. An isotope separating system comprising a plurality of horizontally and vertically arranged separating units, each identical to said isotope separating apparatus of claim 2.

* * * * *